UNITED STATES PATENT OFFICE.

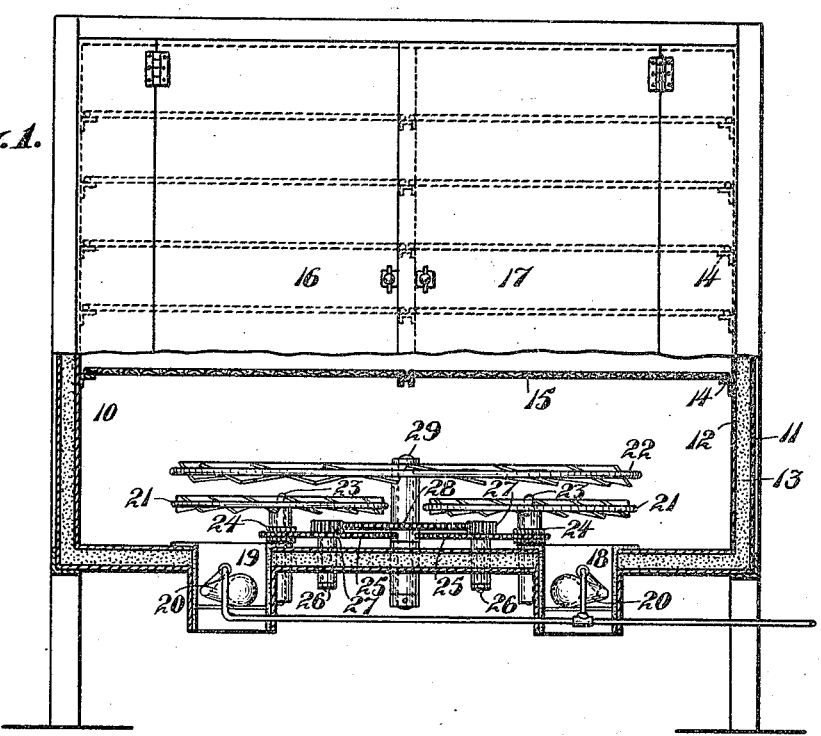
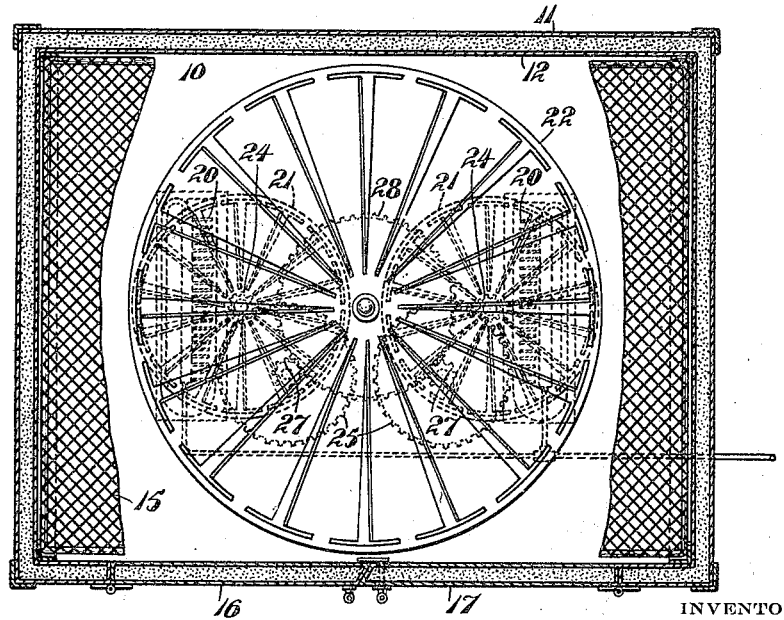

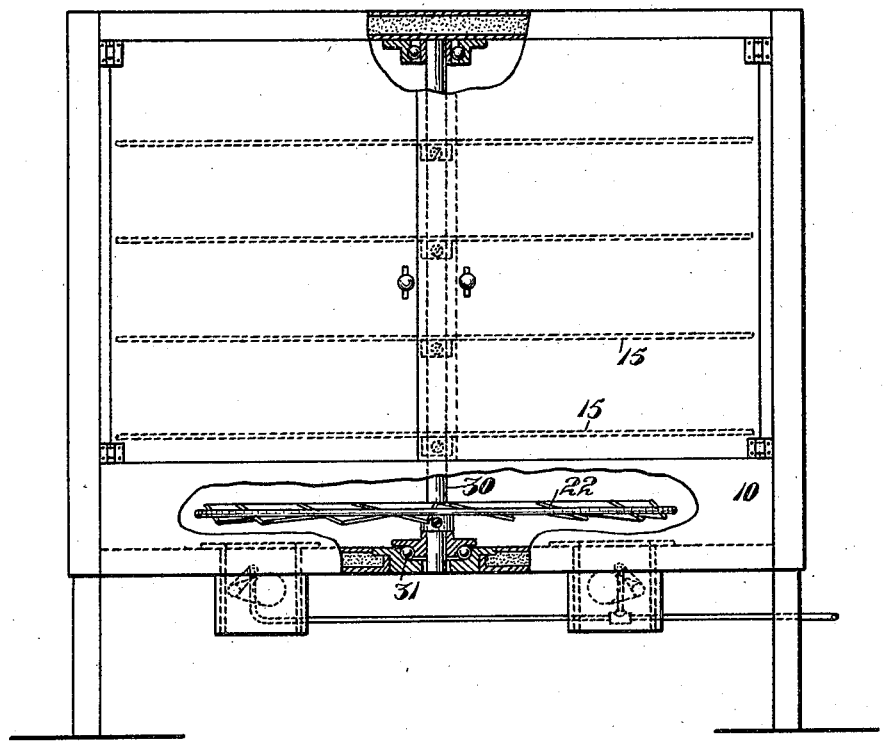

JAMES J. REID, OF OAKLAND, CALIFORNIA.

HEATING AND BAKING STRUCTURE.

1,390,542. Specification of Letters Patent. Patented Sept. 13, 1921.

Application filed March 3, 1920, Serial No. 362,977. Renewed February 16, 1921. Serial No. 445,448.

*To all whom it may concern:*

Be it known that I, JAMES J. REID, a citizen of the United States, residing at Oakland, county of Alameda, and State of California, have invented a new and useful Improvement in Heating and Baking Structures, of which the following is a specification.

This invention relates to a heating structure and is particularly concerned with a baking oven.

It is the principal object of the present invention to provide a heating structure in which a uniform and automatic distribution of heat is brought about, thus making it particularly applicable in use in connection with baking ovens, to insure that the heat from one or more like sources of supply may be properly distributed over a large predetermined area and will be maintained in circulation so that all of the bread within the oven will be uniformly cooked without movement of the pans during the operation or any continuous conveying means by which their positions may be changed.

The present invention contemplates the use of heating chamber within which heating units are placed and from which units the heat is intended to arise into the heat compartment and to be distributed by a set of vanes adapted to rotate on a shaft and to be propelled by the upward movement of the heated air, said vane members causing the heat to circulate throughout the entire structure and to pass upwardly through the grate bars of shelves upon which the pans of bread rest.

Another form of the invention connecting the rotating vane elements with the central shaft upon which the shelves are carried and which are rotated by the action of the heated air against the vanes.

The invention is illustrated by way of example in the accompanying drawings, in which:

Figure 1 is a view in front elevation showing an oven constructed according to the present invention and parts broken away to more clearly disclose the details of the heat distributing elements.

Fig. 2 is a view in horizontal section and elevation with parts broken away showing the heat distributing unit and the gearing driven thereby.

Fig. 3 is a view in front elevation illustrating a modified form of the present invention with parts broken away to more clearly show its details.

In the drawings, 10 indicates an oven structure preferably formed with outer and inner spaced shells 11 and 12. Between these shells heat insulating material 13 is placed. The inner shell carries a plurality of angle-irons 14 for the support of grated shelves 15. A plurality of these shelves are super-imposed within the oven and are used to receive bread pans. The front of the oven is equipped with doors 16 and 17 which may permit access to the shelves into the interior of the compartment. A floor of the oven is formed with openings 18 and 19 within which oil burners 20 are mounted. The bottoms of these openings are uncovered so that a free circulation of the air may be maintained into the oven and around the burners thus supporting proper combustion of the gaseous fuel delivered to said burners. As indicated in Fig. 2 the burners are longitudinally extending and are parallel. It would thus be evident that without some heat distributing means proper uniform distribution of heat within the oven could not be maintained. In the form of the device shown in Figs. 1 and 2, a plurality of heat distributing members is provided, comprising a pair of small rotating fans 21 and a large super-imposed fan 22. The small fans are mounted upon parallel shafts 23 extending vertically through the floor of the oven and are supported over the burners so that of necessity the heated air passing from the burners must strike against the inclined vanes of the fans and cause them to rotate. Pinions 24 are secured upon these shafts and are in mesh with gears 25 carried by secondary shafts 26. The upper ends of these shafts are fitted with pinions 27 both of which mesh with a large central gear 28 which is secured upon a central vertical shaft 29. This last-named shaft carries the large fan 22 and is fixed thereto. It will thus be seen that positive rotation of the small fans 21 will drive the large fan through the gear trains previously described and will cause rotation of this large fan to further assist in agitating the upward traveling heated air and in causing it to be disseminated throughout the heat chamber. It will be recognized that although this heat distributing means is especially applicable to a baking oven yet it could be used to advantage in a heater adapted to draw air into a room and obtain uniform distribution thereof.

Reference being had to Fig. 3 it will be seen that the force exerted by circulating heated air is utilized in rotating the shelves 15. These shelves are mounted upon a central spindle 30 which is in reality a continuation of the spindle 29 shown in Fig. 1. Below the shelves, fan member 22 is secured and is intended to be actuated by the upward movement of the heated air as it strikes the inclined vanes of the fan and thus rotates the fan with the superimposed shelves. The lower end of shaft 30 is fitted with combined radial and thrust bearings 31 by which the weight is supported and free rotation of the shaft permitted.

In operation of the invention, it will be seen that when heat is generated by the burners in the bottom of the oven, this heat will forcibly rise and impinge against the inclined vanes of the various fan members. These will be caused to rotate and will produce the desired result of equally distributing the heat throughout the oven and preventing any excessive lock members.

It will thus be seen that the device here disclosed, while simple in construction and operation yet it provides efficient means for uniformly distributing a heat generating unit as especially required in baking ovens.

While I have shown the preferred form of my invention as now known to me, it will be understood that various changes in the construction, combination and arrangement of parts may be made by those skilled in the art without departing from the spirit of the invention as claimed.

Having thus described my invention, what I claim and desire to secure by Letters Patent, is:

1. In a heating structure, a heat generating element and movable means actuated by the radiating heated air to uniformly distribute said heated air over a given area.

2. In a heating structure, a heat generating unit, and a rotary element disposed thereover and adapted to be actuated by the radiating heat whereby it will be rotated and the heated air disseminated.

3. In a heating structure, a heating element, a rotary fan member having inclined vanes, said member being disposed in the path of travel of the heated air radiating from said element and an inclosing chamber within which uniform distribution of heat is maintained by the action of the fan rotated by the radiated heated air.

4. In a baking oven, an inclosing structure, a vertically journaled shaft therein, a series of superposed shelves fixed to the shaft, a horizontal fan member fixed to the shaft below the shelves, and a plurality of heating members below the structure with openings discharging heat upwardly through the fan whereby the fan is rotated and the heat distributed through the oven structure.

5. In a baking oven, a pair of burners disposed at the bottom of said oven, separate fan members mounted upon vertical shafts and positioned over the burners whereby the radiation of heat from the burners will produce rotation of the fans, a heat circulating fan of large diameter overhanging both of the first-named fans and gearing connecting the pair of fans with the heat circulating fan whereby simultaneous rotation of all three fans will be brought about and a complete circulation and distribution of heated air effected.

In testimony whereof I have hereunto set my hand in the presence of two subscribing witnesses.

JAMES J. REID.

Witnesses:
MARGUERITE S. BRUNER,
ELMER G. LERD.